UNITED STATES PATENT OFFICE.

A. B. W. BULLARD, OF WORCESTER, ASSIGNOR TO AUGUSTUS RICHARDSON, OF FRAMINGHAM, MASSACHUSETTS.

IMPROVED COMPOSITION FOR PAINT.

Specification forming part of Letters Patent No. 41,119, dated January 5, 1864.

*To all whom it may concern:*

Be it known that I, A. B. W. BULLARD, a resident of the city and county of Worcester, and State of Massachusetts, have invented a new and useful Paint or Composition for Painting Buildings; and I do hereby declare the same to be fully described in the following specification.

The composition in question has for its constituents starch, paris-white, (or common whiting,) water, alum, and chloride of sodium. The proportions of the remaining or soluble ingredients to three wine gallons of water are one and a half pound (avoirdupois) of starch, twelve pounds (avoirdupois) of paris-white, one-half an ounce of alum, and one ounce of chloride of sodium. In the process of compounding the said ingredients two and one-half gallons of the water are to be put into a kettle and heated to boiling temperature. Next, the starch should be mixed with the remaining half-gallon of water, and when the starch is perfectly dissolved the solution should be poured into the kettle and be thoroughly incorporated with the water thereof, the heat being continued so as to bring the whole up to a temperature of 212° Fahrenheit, or thereabout. Next, the chloride of sodium is to be incorporated with the solution. After this the kettle should be removed from the fire, by which it may be heated, and the paris-white (which previously should have been thoroughly pulverized and sifted) is to be mixed with the starchy solution, and the whole suffered to stand until cooled to atmospheric temperature, it being stirred occasionally in the meantime. After this the alum, dissolved in one pint of hot water, is to be added to the mixture, and the whole is to be put through a paint-mill and be ground therein, after which it will be ready for use.

To color the paint or composition, any suitable pigment or pigments may be employed.

The alum serves not only to prevent the composition from becoming acid, but answers other useful purposes. The chloride of sodium causes the composition to set harder than it otherwise would, and besides it aids in fixing the starch and paris-white.

I claim—

The above-described composition as made of the materials and in manner substantially as specified.

A. B. W. BULLARD.

Witnesses:
JOSEPH FULLER,
L. R. BATES.